(12) United States Patent
Xu et al.

(10) Patent No.: US 9,080,669 B2
(45) Date of Patent: Jul. 14, 2015

(54) SYSTEM AND METHOD OF SELECTING OPTIMUM GEAR OF AUTOMOBILE

(71) Applicant: XIAMEN KING LONG MOTOR VEHICLE INSPECTION CO., LTD., Xiamen, Fujian (CN)

(72) Inventors: Yifan Xu, Fujian (CN); Xiaobing Chen, Fujian (CN); Weihong Ye, Fujian (CN); Fangming Zhou, Fujian (CN); Qiangsheng Liu, Fujian (CN)

(73) Assignee: Xiamen King Long Motor Vehicle Inspection Co., LTD., Xiamen (CN)

( * ) Notice: Subject to any disclaimer, the term of this patent is extended or adjusted under 35 U.S.C. 154(b) by 0 days.

(21) Appl. No.: 14/348,058

(22) PCT Filed: Jan. 5, 2013

(86) PCT No.: PCT/CN2013/070077
§ 371 (c)(1),
(2) Date: Mar. 28, 2014

(87) PCT Pub. No.: WO2013/107302
PCT Pub. Date: Jul. 25, 2013

(65) Prior Publication Data
US 2015/0012192 A1    Jan. 8, 2015

(30) Foreign Application Priority Data

Jan. 20, 2012 (CN) .......................... 2012 1 0018252

(51) Int. Cl.
*F16H 61/02* (2006.01)
*F16H 63/42* (2006.01)

(52) U.S. Cl.
CPC ............ *F16H 61/0213* (2013.01); *F16H 63/42* (2013.01); *F16H 2061/0216* (2013.01); *F16H 2061/0218* (2013.01); *F16H 2063/426* (2013.01)

(58) Field of Classification Search
CPC ..... F16H 63/42; F16H 61/02; F16H 61/0213; F16H 2061/0216; F16H 2061/0218; F16H 2063/426
See application file for complete search history.

(56) References Cited

U.S. PATENT DOCUMENTS

| | | | |
|---|---|---|---|
| 2004/0148084 A1* | 7/2004 | Minami | 701/55 |
| 2005/0143221 A1* | 6/2005 | Kuwahara et al. | 477/97 |
| 2010/0305822 A1* | 12/2010 | Kresse et al. | 701/56 |
| 2012/0083980 A1* | 4/2012 | Kresse et al. | 701/56 |
| 2013/0046449 A1* | 2/2013 | Yucel et al. | 701/51 |
| 2013/0144581 A1* | 6/2013 | Johnson et al. | 703/8 |

* cited by examiner

*Primary Examiner* — Justin Holmes

(57) ABSTRACT

A system and method of selecting optimum gear of automobile is provided. The system includes a data processor; a running vehicle data collection module; an output module; and a memory. The memory is stored with universal characteristic curve of an engine, gear ratios of a gearbox, speed reduction ratios, and a tire radius. The running vehicle data collection module collects and sends a current vehicle speed, revolutions of the engine, and an output torque of the engine to the data processor. The data processor processes the universal characteristic curve of the engine, the gear ratios of the gearbox, the speed reduction ratios, and the tire radius to determine a current gear and an optimum gear. The data processor outputs the optimum gear to the output module if the current gear is not the optimum gear. The system can select optimum gear in real time and lower fuel consumption.

1 Claim, 3 Drawing Sheets

SYSTEM AND METHOD OF SELECTING OPTIMUM GEAR OF AUTOMOBILE

BACKGROUND OF THE INVENTION

1. Field of the Invention

The invention relates to automobiles and more particularly to a system and method of selecting optimum gear of automobile.

2. Description of Related Art

Energy saving and living a low carbon life are trends as petroleum price increases significantly. Emission of automobiles is the major pollution source of cities worldwide. Taking public transportation is encouraged by governments. Further, how to lower fuel consumption of an automobile is an issue of interest. High performance engines and strict emission laws also play a role in increasing fuel efficiency. Furthermore, good driving habits contribute to the lowering of fuel consumption. Many drivers can lower fuel consumption by 25% after a short period of training based on a study released by Ford Motor Company. Further, many drivers, after being trained to one to one and half year, can lower fuel consumption by 15% in comparison with drivers not being trained. This means the longer of training time the fuel consumption of an automobile driven by a driver being trained is lower. Thus, it is desirable of developing a technique of training a driver at any time and alerting a driver of good driving habits.

China Patent Application No. 201010157270.5 discloses an apparatus of selecting optimum gear and alerting same to a driver of an automobile powered by a diesel engine. It is characterized in that the optimum gear is selected based on data points of a curve representing constant speed for maximum operating efficiency, and the selected optimum gear is shown on a display for alerting a driver. It is further characterized in that CRUISE software is used to calculate torques at different gear ratios, full load, and no load of an automobile prior to implementation. Furthermore, different loads and fuel consumption curves of different gear ratios for determining optimum vehicle speed are calculated by either experiments or simulations. The patent has the following drawbacks:

Accuracy of the selection of optimum gear depends on the simulation result which however, has variances. Thus, the selection of optimum gear is not reliable.

Great processing time and large memory are required due to the storage of a great number of fuel consumption curves of different gear ratios. Thus, the apparatus is bulky and the cost is prohibitively high.

Fuel consumption curves of different gear ratios are required to calculate if the automobile has been modified or has a lower performance due to wear. Thus, its application is limited.

Thus, the need for improvement still exists.

SUMMARY OF THE INVENTION

It is therefore one object of the invention to provide a system and method of selecting optimum gear of an automobile for eliminating drawbacks including poor accuracy, large memory, and limited application associated with the prior art.

In one aspect of the invention, there is provided a system of selecting optimum gear of an automobile comprising a data processor; a running vehicle data collection module connected to the data processor; an output module connected to the data processor; and a memory connected to the data processor; wherein the memory is stored with universal characteristic curve of an engine of the automobile, gear ratios of a gearbox of the automobile, speed reduction ratios, and a tire radius of the automobile; wherein the running vehicle data collection module collects and sends a current vehicle speed, revolutions of the engine, and an output torque of the engine to the data processor; wherein the data processor processes the universal characteristic curve of the engine, the gear ratios of the gearbox, the speed reduction ratios, and the tire radius to determine a current gear and an optimum gear; and wherein the data processor outputs the optimum gear to the output module if the current gear is not the optimum gear.

There is further comprised of a vehicle specifications and parameters module connected to the memory, the vehicle specifications and parameters module being capable of accessing the universal characteristic curve of the engine, the gear ratios of the gearbox, the speed reduction ratios, and the tire radius from the memory.

Preferably, vehicle specifications and parameters stored in the vehicle specifications and parameters module include a serial number and the universal characteristic curve of the engine, a gearbox model, the gear ratios, the speed reduction ratios, and the tire radius.

There is further comprised of a display connected to the output module so that the output module is capable of outputting the optimum gear to the display for display.

In another aspect of the invention, there is provided a method of selecting optimum gear of an automobile comprising the steps of (1) storing a universal characteristic curve of an engine of the automobile, gear ratios of a gearbox of the automobile, speed reduction ratios, and a tire radius of the automobile; (2) collecting revolutions of the engine, an output torque of the engine, and a speed of the automobile in running; (3) obtaining a current gear ratio by calculating the revolutions of the engine, the tire radius, the speed of the running automobile, and the speed reduction ratios; and determining a current gear based on the gear ratios of the gearbox; (4) simulating gear shift; and obtaining the revolutions of the engine and the output torque of the engine by calculating gears other than the current gear; (5) calculating fuel consumption rates of different gears based on a fuel consumption curve of the universal characteristic curve of the engine; comparing the fuel consumption rates of the different gears; and selecting an optimum gear from one of the gears having a lowest fuel consumption rate; and (6) determining whether the optimum gear is the current gear; and outputting the optimum gear if the determination is negative.

There is further comprised of the step of deleting the calculation of fuel consumption rates of the different gears based on the fuel consumption curve of the universal characteristic curve of the engine of step (5) if the revolutions of the engine and the output torque of the engine do not fall on data points of the universal characteristic curve of the engine.

The invention has the following advantages: The universal characteristic curve is employed as the basis of selecting optimum gear. No vehicle experiment and simulation is required. Workload and reliance on vehicle parameters are greatly decreased. Data calculation times are significantly decreased. Applications are greatly increased. Parameters including universal characteristic curve, speed reduction ratios, gear ratios of gearbox, and tire radius can be obtained from the automobile manufacturers, specifications of automobile, and/or automobile label. It is simple and is applicable to various automobiles of different manufacturers. Gear number can be outputted via port. Further, optimum gear can be shown on a display mounted on the dashboard, a computer mounted on the automobile, etc. Gear of the automobile can be monitored at any time. Driver is alerted of optimum gear at any time and thus fuel consumption can be decreased greatly.

Further, damage to the automobile due to inappropriate gear can be prevented from occurring. Furthermore, the invention can select optimum gear in real time, change bad driving habits, and lower fuel consumption.

The above and other objects, features and advantages of the invention will become apparent from the following detailed description taken with the accompanying drawings.

LIST OF REFERENCE NUMERALS

Figure 1:
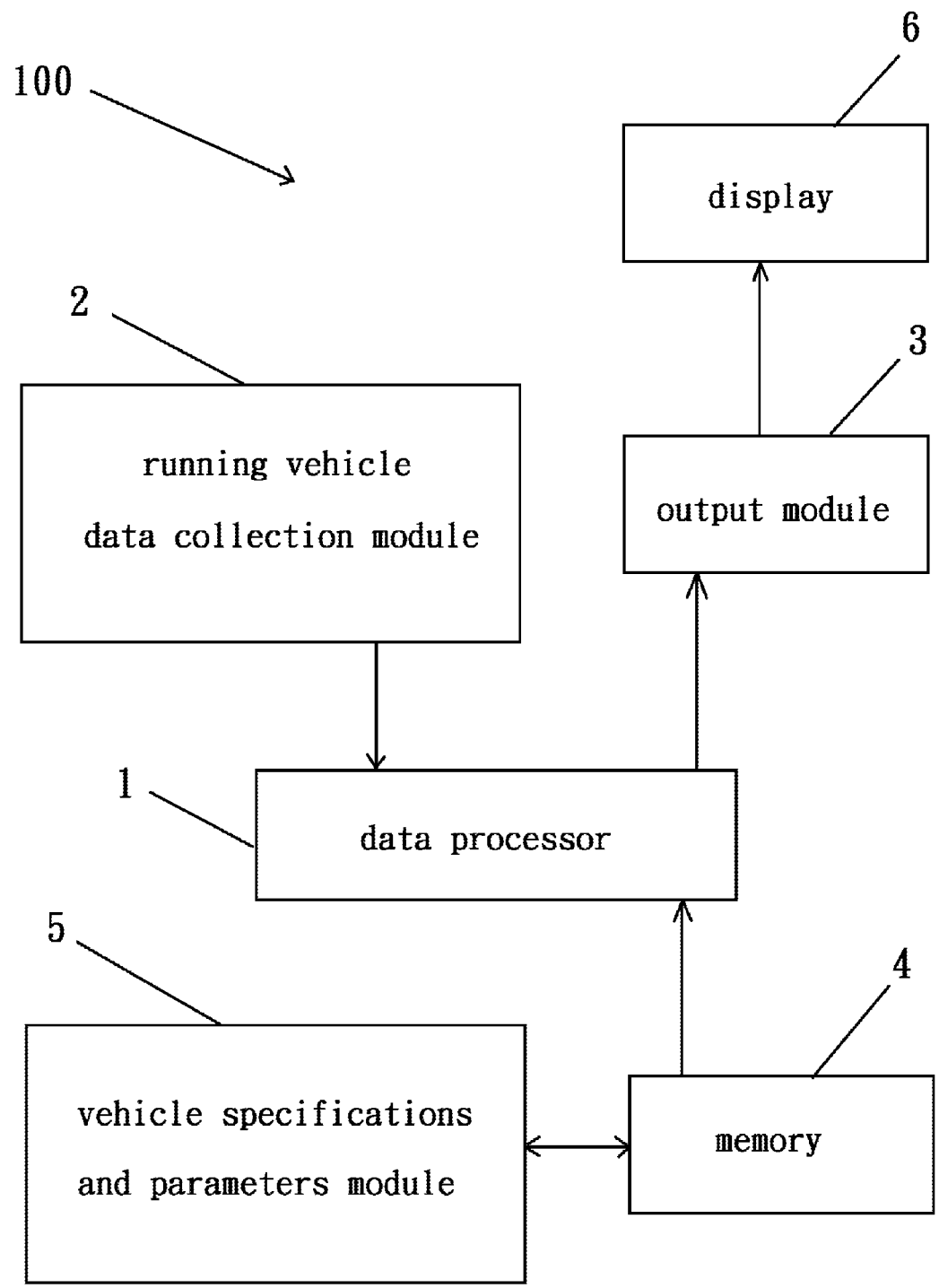
FIG. 1 is a block diagram of a system of selecting optimum gear of automobile according to the invention.

100 system of selecting optimum gear of automobile
1 data processor
2 running vehicle data collection module
3 output module
4 memory
5 vehicle specifications and parameters module
6 display

DETAILED DESCRIPTION OF THE INVENTION

The invention will be best understood from the following detailed description taken with the accompanying drawings.

Referring to FIG. 1, a system of selecting optimum gear of automobile in accordance with the invention is generally designated by 100. The system 100 comprises a data processor 1, a running vehicle data collection module 2, an output module 3, and a memory 4. The data processor 1 is the brain of the system 10 and can be implemented by a microprocessor. The running vehicle data collection module 2, the output module 3, and the memory 4 are connected to the data processor 1.

The memory 4 is stored with universal characteristic curve of an engine, gear ratios, speed reduction ratios, and tire radius. Preferably, the system 100 further comprises a vehicle specifications and parameters module 5 interconnecting the memory 4. Thus, vehicle specifications and parameters including serial number and universal characteristic curve of an engine, gearbox model, gear ratios, speed reduction ratios, and tire radius can be stored in the memory 4.

The running vehicle data collection module 2 contains vehicle speed, revolutions per minute (RPM) of the engine, and output torque of the engine which are sent to the data processor 1 by transmitting signals of sensors via a cable.

The universal characteristic curve of an engine, gear ratios, speed reduction ratios, and tire radius stored in the memory 4 and the vehicle speed, RPM of the engine, and output torque of the engine stored in running vehicle data collection module 2 are fed to the data processor 1 to process. As a result, current gear is calculated and optimum gear is selected by the data processor 1. The optimum gear is sent to the output module 3 if the current gear is not the optimum gear. Preferably, the system 100 further comprises a display 6 connected to the output module 3 for showing the optimum gear.

Figure 3:
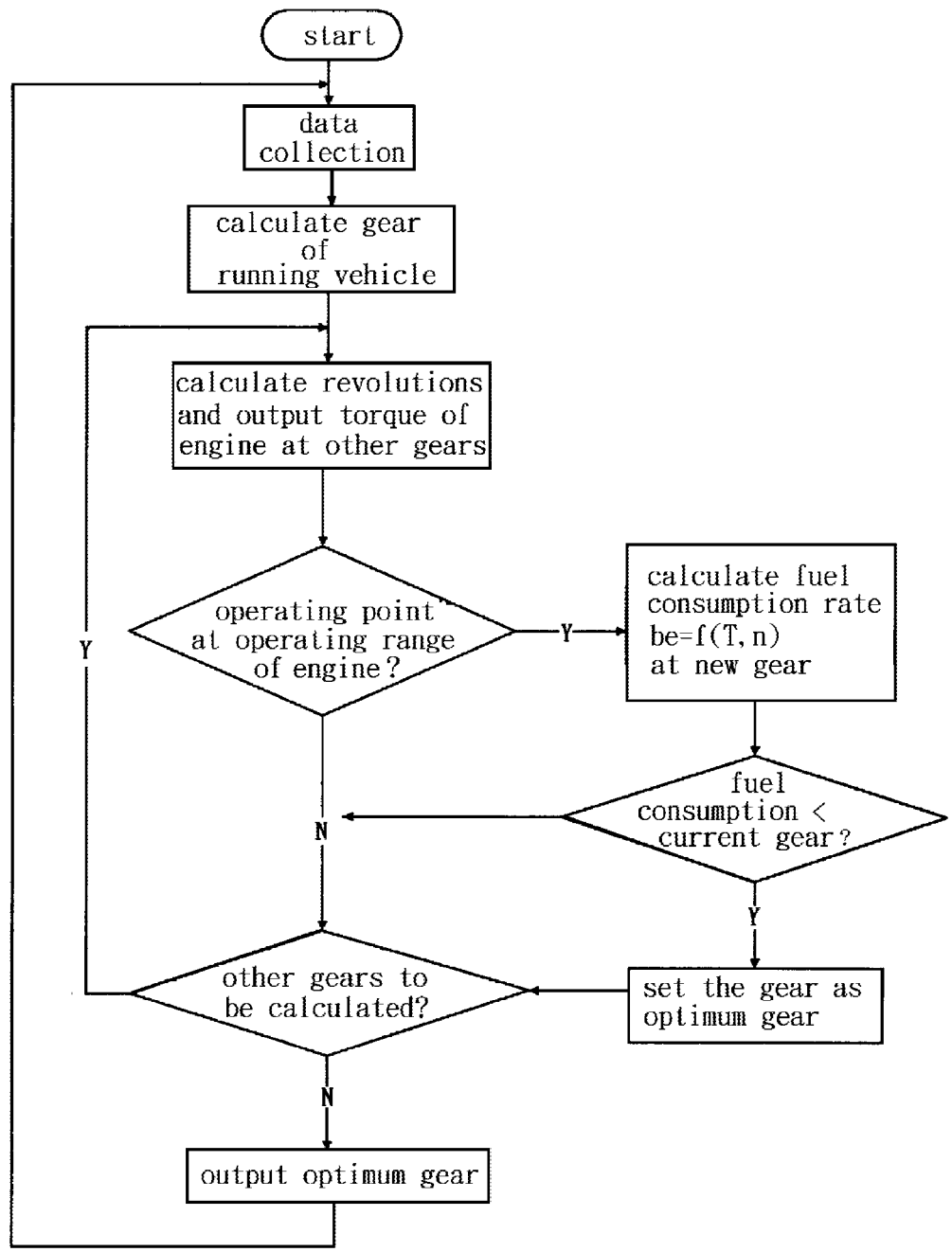
FIG. 3 is a flow chart of a method of selecting optimum gear of automobile according to the invention.

Referring to FIG. 3, a method of selecting optimum gear of automobile in accordance with the invention comprises the steps of:

(1) storing a universal characteristic curve of an engine, gear ratios, speed reduction ratios, and tire radius of an automobile;

(2) collecting revolutions per minute (RPM) of the engine, output torque of the engine, and speed of a running automobile;

(3) obtaining current gear ratio by calculating the RMP of the engine, the tire radius, the speed of the running automobile, and the speed reduction ratios, and determining current gear based on gear ratios of a gearbox;

(4) simulating gear shift, and obtaining the RPM of the engine and the output torque of the engine by calculating other gears;

(5) calculating fuel consumption rates of different gears based on a fuel consumption curve of the universal characteristic curve of the engine, comparing the fuel consumption rates of the different gears, and selecting optimum gear from the gear having the lowest fuel consumption rate; and (6) determining whether the optimum gear is the current gear, and outputting the optimum gear if the determination is negative.

Preferably, deleting the calculation of fuel consumption rates of different gears based on a fuel consumption curve of the universal characteristic curve of the engine of step (5) if the RPM of the engine and the output torque of the engine do not fall on data points of the universal characteristic curve of the engine.

Figure 2:
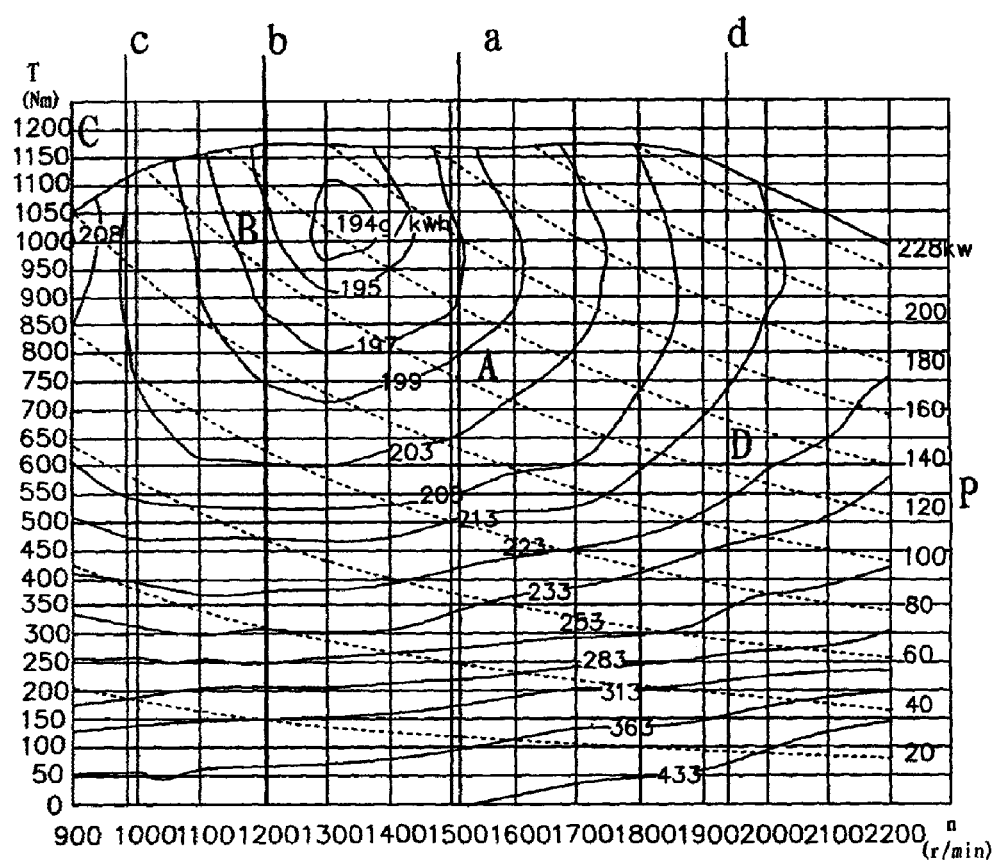
FIG. 2 is a chart of torque versus engine speed for a universal characteristic curve of the engine of an automobile according to the invention.

Referring to FIG. 2 in conjunction with FIG. 3, a preferred embodiment of the invention is described for illustrating above method. In FIG. 2, it shows a chart of torque versus engine speed for a universal characteristic curve of the engine of an automobile having four gears.

The current gear is the second gear. RPM of the engine is "a". The operating point is "A". The output torque of the engine is unchanged if the automobile runs at constant speed. Points "b", "c", and "d" represent three different gears of the engine. The joining points of the "b", "c", and "d" and an equal power line P passing point "A" are points "B", "C", and "D" which are operating points of the engine when the automobile running at current speed but different gears. Point "C" is externally of the engine operating points and it means the engine cannot operate at a gear represented by point "C" under the current vehicle speed. Thus, point "A" is excluded from fuel consumption calculation.

In the universal characteristic curve, points closer to center represent engines having lower fuel consumption, i.e., the engines having better fuel economies. As shown, point "B" represents an engine having the lowest fuel consumption. Fuel consumption per 100 km is presented by the following equation:

$$Q \propto \frac{Pb_e}{v}$$

Where both v and P are constants when an automobile runs at constant speed. The operating point having the lowest fuel consumption represents optimum gear. Hence, gear corresponding to point "B" is optimum gear at the current vehicle speed.

A flow chart of the method of the invention is illustrated in FIG. 3 and comprises: Storing fuel consumption indicated by a universal characteristic curve of an engine, gear ratios n, speed reduction ratios i0, and tire radius r of an automobile in a memory 4. Collecting revolutions n of the engine, output torque T of the engine, and speed v of a running automobile. Obtaining current gear ratio I by using the following equation:

$$i_g = 0.377 \times \frac{n \times r}{v \times i_0}$$

Determining current gear based on relationship of gearbox parameters and the current gear ratio I. Simulating gear shift by using the following equations:

$$n' = \frac{i'}{i}n; \text{ and}$$

$$T' = \frac{i}{i'}T$$

Where i' means gear ratio of the gearbox at a new gear. Revolutions n' of the engine at the new gear and output torque thereof are obtained. On the universal characteristic curve of the engine, fuel consumption can be expressed by the following equation:

$$b_e = f(n,T)$$

Where n means revolutions of the engine, and T represents output torque of the engine. Thus, fuel consumption of the engine at different gears can be obtained by inquiring MAP of the engine stored in the memory. The gear is optimum gear of the automobile at the current speed if the gear has the lowest fuel consumption and is not current gear. The system 100 outputs the gear to the display 6 for alerting driver. In detail, the displayed gear is the optimum gear which is the same as the current gear. A message is displayed for alerting the driver that the gear should be increased if the optimum gear is greater than the current gear. Alternatively, a message is displayed for alerting the driver that the gear should be decreased if the optimum gear is less than the current gear.

The invention is applicable to different kinds of automobile, transmissions being changed due to vehicle modification, etc. By employing the vehicle specifications and parameters module 5, it is possible of updating fuel consumption indicated by a universal characteristic curve of an engine, gear ratios n, speed reduction ratios i0, and tire radius r of an automobile in the memory 4.

The invention has the following advantages:

1. The universal characteristic curve is employed as the basis of selecting optimum gear. No vehicle experiment and simulation is required. Workload and reliance on vehicle parameters are greatly decreased. Data calculation times are significantly decreased. Applications are greatly increased.

2. Parameters including universal characteristic curve, speed reduction ratios, gear ratios of gearbox, and tire radius can be obtained from the automobile manufacturers, specifications of automobile, and/or automobile label. It is simple and is applicable to various automobiles of different manufacturers.

3. Gear number can be outputted via port. Further, optimum gear can be shown on a display 6 mounted on the dashboard, a computer mounted on the automobile, etc.

4. Gear of the automobile can be monitored at any time. Driver is alerted of optimum gear at any time and thus fuel consumption can be decreased greatly. Further, damage to the automobile due to inappropriate gear can be prevented from occurring.

In short, the invention is characterized in that analyzing operating points of an engine indicated by a universal characteristic curve thereof, determining fuel consumption of each of different gears of the engine, and selecting optimum gear based on the determination.

Although the invention has been described in detail, it is to be understood that this is done by way of illustration only and is not to be taken by way of limitation. The scope of the invention is to be limited only by the appended claims.

What is claimed is:

1. A method of selecting optimum gear of an automobile comprising the steps of:
    (1) storing a universal characteristic curve of an engine of the automobile, gear ratios of a gearbox of the automobile, speed reduction ratios, and a tire radius of the automobile;
    (2) collecting revolutions of the engine, an output torque of the engine, and a speed of the automobile in running;
    (3) obtaining a current gear ratio by calculating the revolutions of the engine, the tire radius, the speed of the running automobile, and the speed reduction ratios; and determining a current gear based on the gear ratios of the gearbox;
    (4) simulating gear shift; and obtaining the revolutions of the engine and the output torque of the engine by calculating gears other than the current gear;
    (5) calculating fuel consumption rates of different gears based on a fuel consumption curve of the universal characteristic curve of the engine; comparing the fuel consumption rates of the different gears; and selecting an optimum gear from one of the gears having a lowest fuel consumption rate;
    (6) deleting the calculation of fuel consumption rates of the different gears based on the fuel consumption curve of the universal characteristic curve of the engine of step (5) if the revolutions of the engine and the output torque of the engine do not fall on data points of the universal characteristic curve of the engine; and
    (7) determining whether the optimum gear is the current gear; and outputting the optimum gear if the determination is negative.

* * * * *